(12) United States Patent
Byeon et al.

(10) Patent No.: US 12,413,120 B2
(45) Date of Patent: Sep. 9, 2025

(54) MOTOR WITH SENSOR COIL

(71) Applicant: LG INNOTEK CO., LTD., Seoul (KR)

(72) Inventors: Dae Gil Byeon, Seoul (KR); Young Dae Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 429 days.

(21) Appl. No.: 17/797,192

(22) PCT Filed: Jan. 26, 2021

(86) PCT No.: PCT/KR2021/001018
§ 371 (c)(1),
(2) Date: Aug. 3, 2022

(87) PCT Pub. No.: WO2021/157935
PCT Pub. Date: Aug. 12, 2021

(65) Prior Publication Data
US 2023/0054067 A1    Feb. 23, 2023

(30) Foreign Application Priority Data

Feb. 5, 2020 (KR) .................. 10-2020-0013618
Apr. 23, 2020 (KR) .................. 10-2020-0049373

(51) Int. Cl.
*H02K 11/225* (2016.01)
*G01D 5/14* (2006.01)
(Continued)

(52) U.S. Cl.
CPC ............ *H02K 11/225* (2016.01); *G01D 5/14* (2013.01); *H02K 5/165* (2013.01); *H02K 7/088* (2013.01); *H02K 21/28* (2013.01)

(58) Field of Classification Search
CPC ...... H02K 11/225; H02K 5/165; H02K 7/088; H02K 21/28; H02K 11/215; H02K 2203/03; G01D 5/14; G01D 5/145
See application file for complete search history.

(56) References Cited

U.S. PATENT DOCUMENTS

2002/0190602 A1    12/2002   Huang et al.
2005/0218861 A1*   10/2005   Kimura ............... H02K 11/215
                                                     318/712
(Continued)

FOREIGN PATENT DOCUMENTS

CN          202334236          7/2012
CN          109217567          1/2019
(Continued)

OTHER PUBLICATIONS

English translation of JPH-0884457-A (Year: 1996).*
(Continued)

*Primary Examiner* — Tulsidas C Patel
*Assistant Examiner* — Joshua Kiel M Rodriguez
(74) *Attorney, Agent, or Firm* — KED & ASSOCIATES, LLP

(57) ABSTRACT

An embodiment may provide a motor including a shaft, a rotor including a rotor core and a coil disposed on the rotor core, a stator disposed outside the rotor, a substrate electrically connected to the coil, and a first housing in which the substrate is disposed and which is coupled to the shaft and the rotor, wherein the substrate includes a sensor and a coil connected to the sensor, the first housing includes a hole, the stator includes a yoke and a magnet disposed on the yoke, the yoke includes a plurality of protrusions, and the protrusions and the hole are disposed to overlap the coil in an axial direction.

10 Claims, 20 Drawing Sheets

(51) Int. Cl.
  *H02K 5/16* (2006.01)
  *H02K 7/08* (2006.01)
  *H02K 21/28* (2006.01)

(56) References Cited

U.S. PATENT DOCUMENTS

2017/0294860 A1    10/2017  Yamasaki
2019/0074751 A1 *   3/2019  Chen ................... H02K 11/215
2019/0157929 A1     5/2019  Cho et al.

FOREIGN PATENT DOCUMENTS

| JP | H01-129746 | 5/1989 | |
| JP | H-0884457 A * | 3/1996 | ............. H02K 11/21 |
| KR | 20-0191099 | 8/2000 | |
| KR | 10-2007-0113730 | 11/2007 | |
| KR | 10-2015-0004442 | 1/2015 | |
| KR | 10-2017-0111260 | 10/2017 | |
| KR | 10-2019-0043831 | 4/2019 | |

OTHER PUBLICATIONS

International Search Report dated May 6, 2021 issued in Application No. PCT/KR2021/001018.
Korean Office Action dated Jan. 15, 2025 issued in Application No. 10-2020-0013618.
Korean Office Action dated Feb. 5, 2025 issued in Application No. 10-2020-0049373.
Chinese Office Action dated Jul. 19, 2025 issued in Application No. 202180013103.X.

* cited by examiner

[FIG. 1]
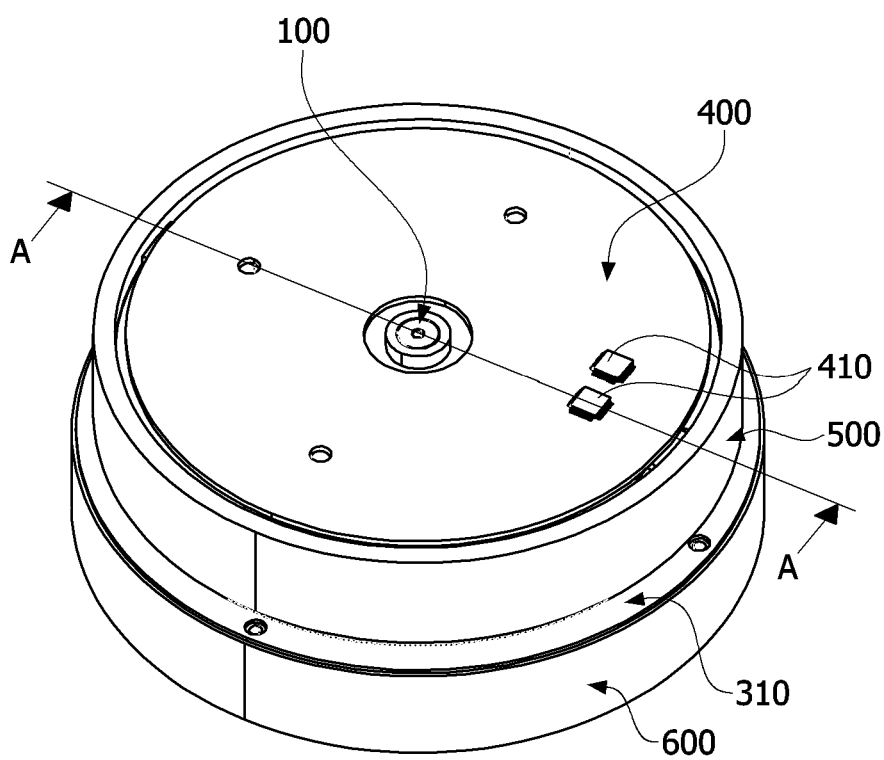

[FIG. 2]
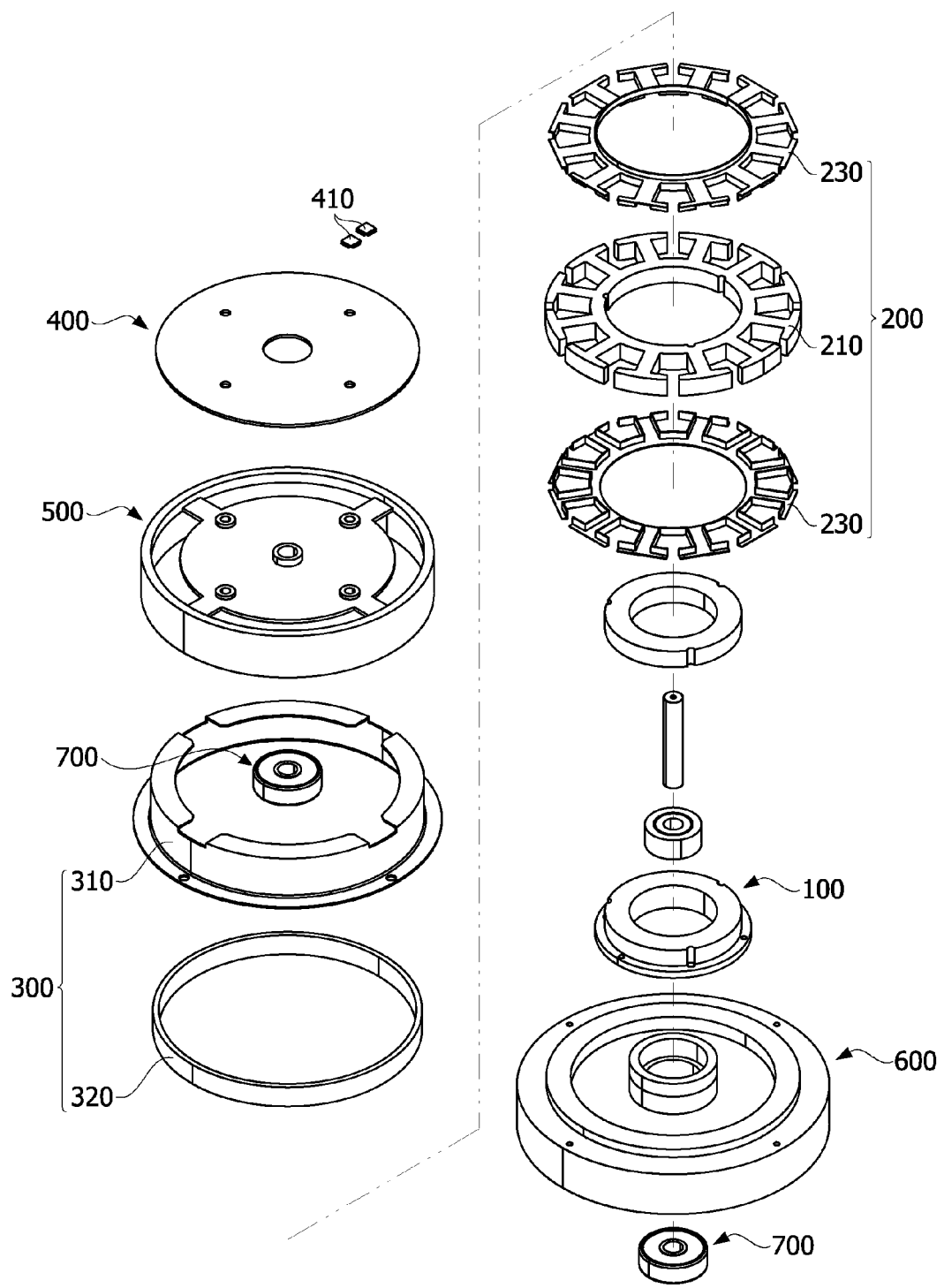

[FIG. 3]
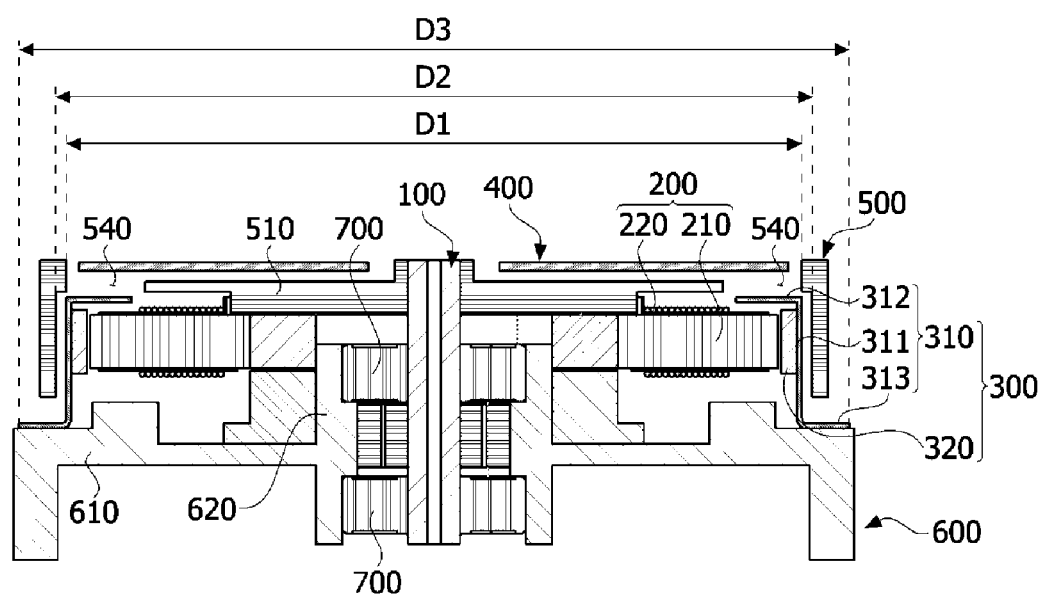

[FIG. 4]
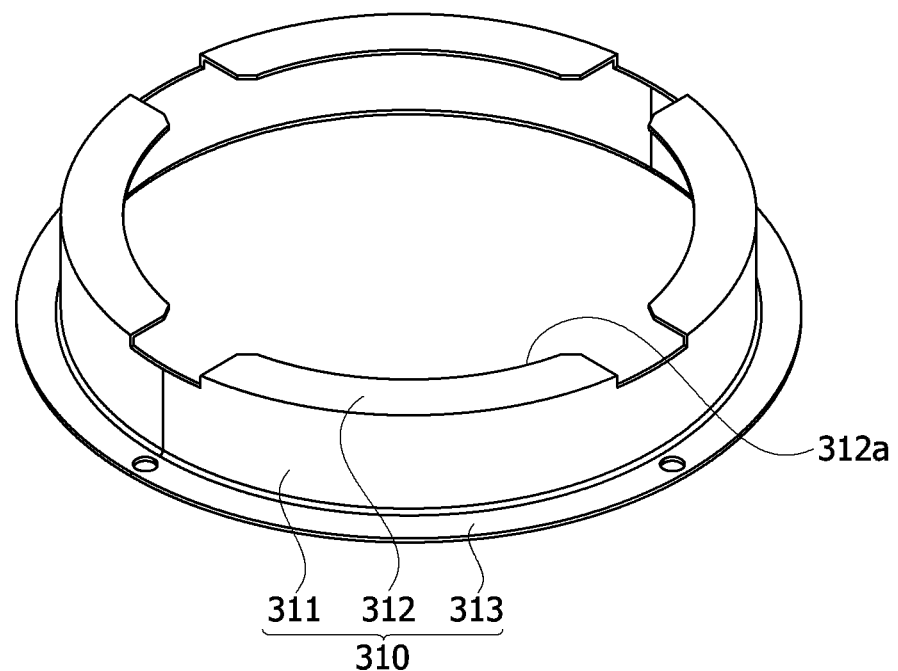

[FIG. 5]
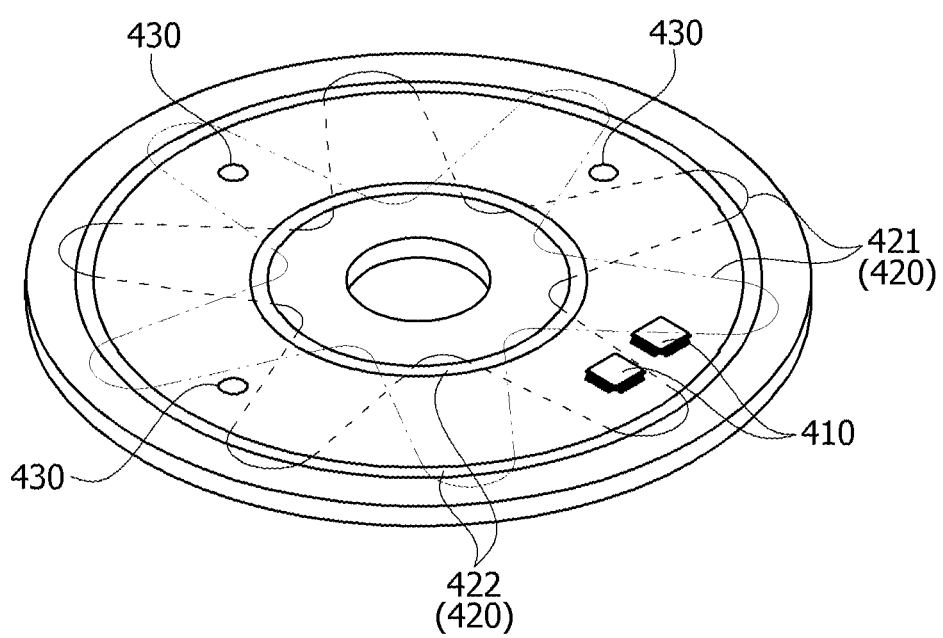

[FIG. 6]
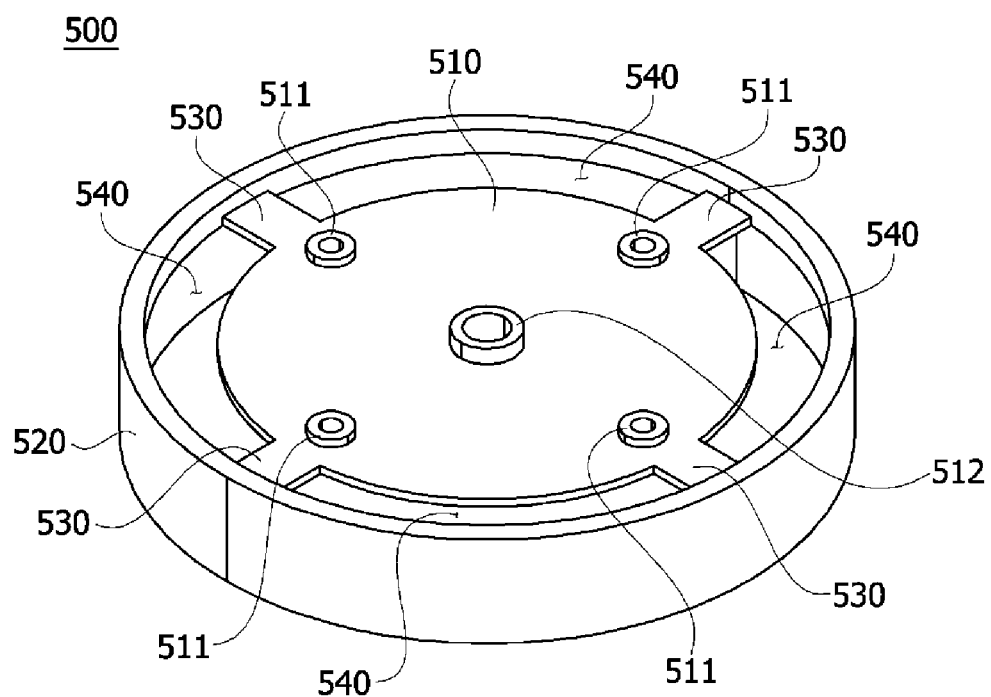

[FIG. 7]
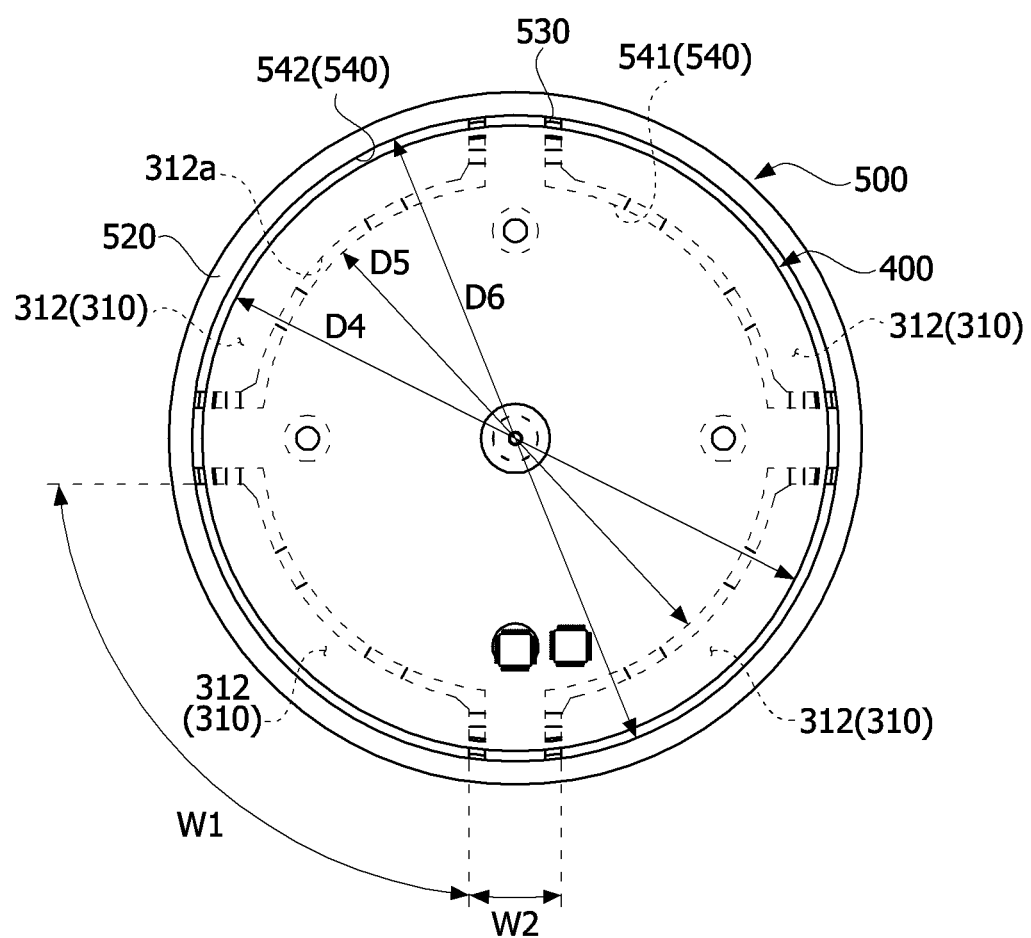

[FIG. 8]
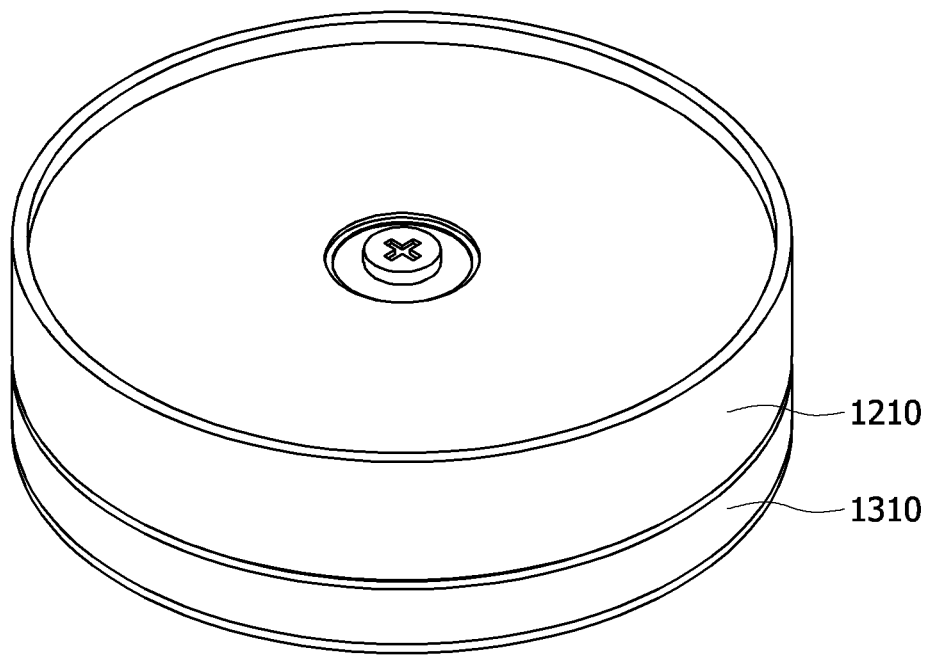

[FIG. 9]
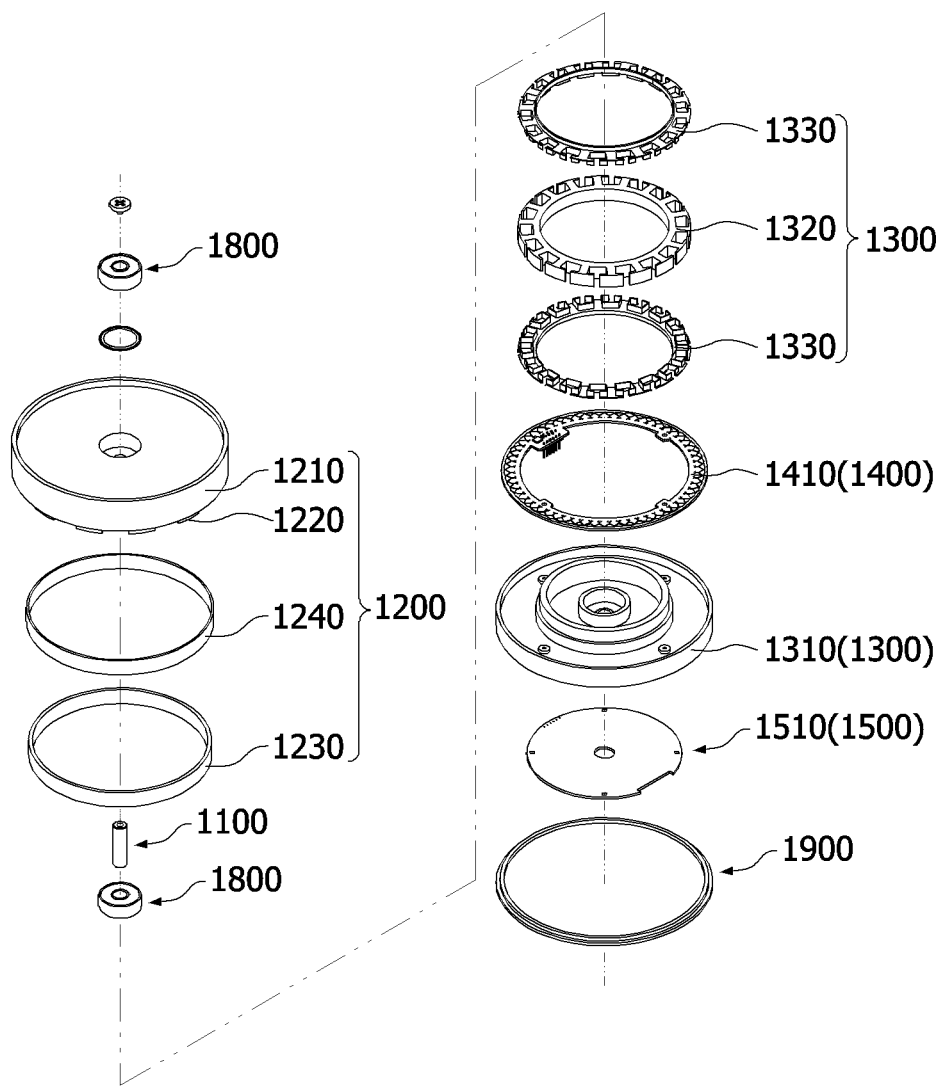

[FIG. 10]
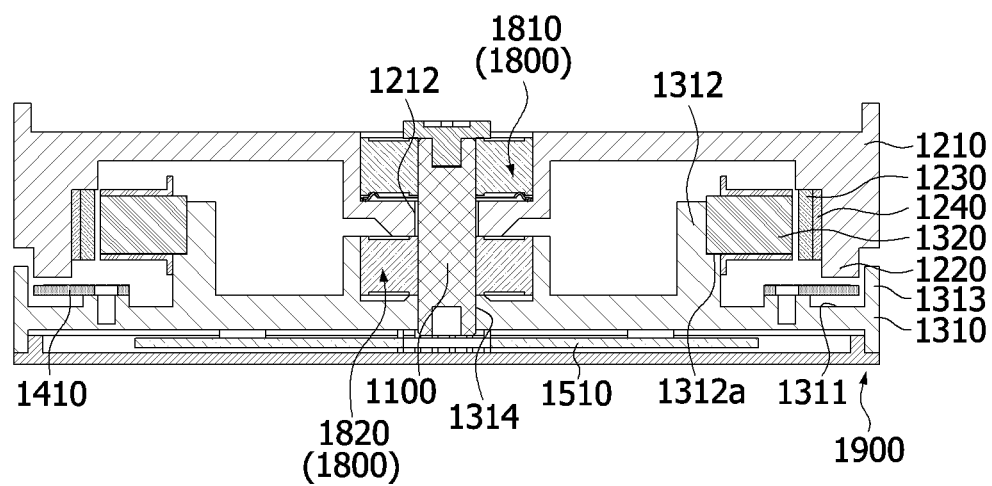

[FIG. 11]
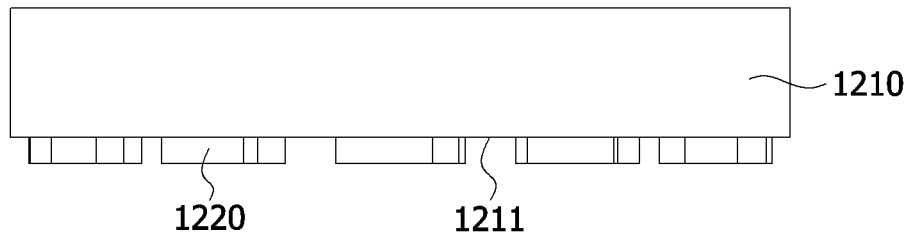

[FIG. 12]
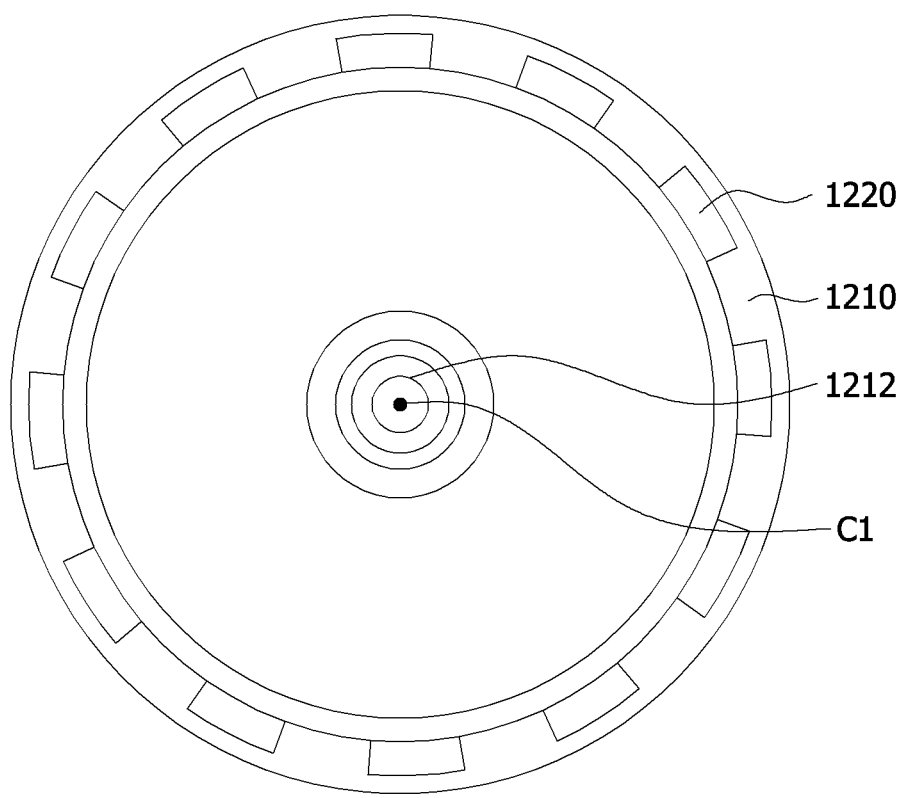

[FIG. 13]
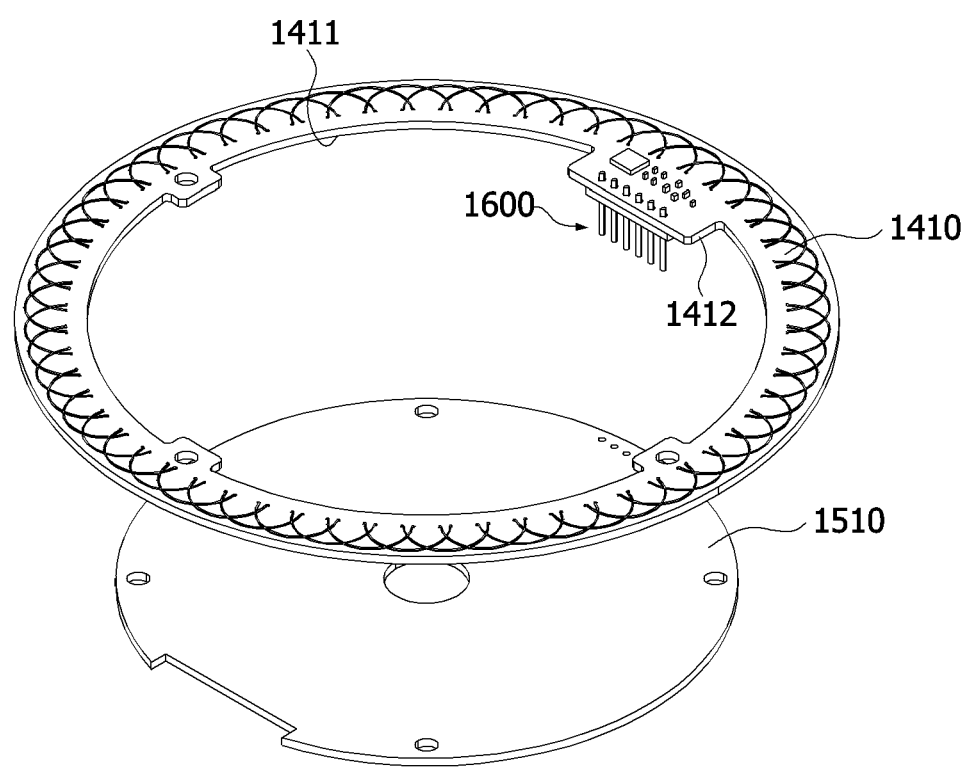

[FIG. 14]
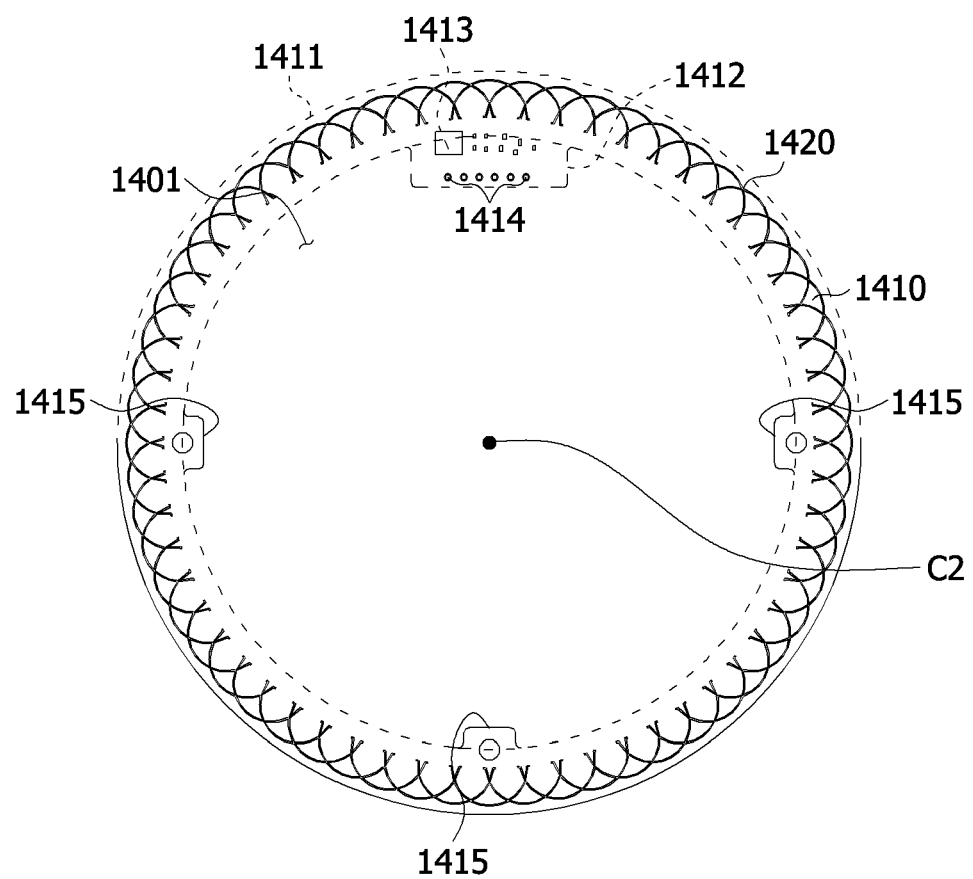

[FIG. 15]
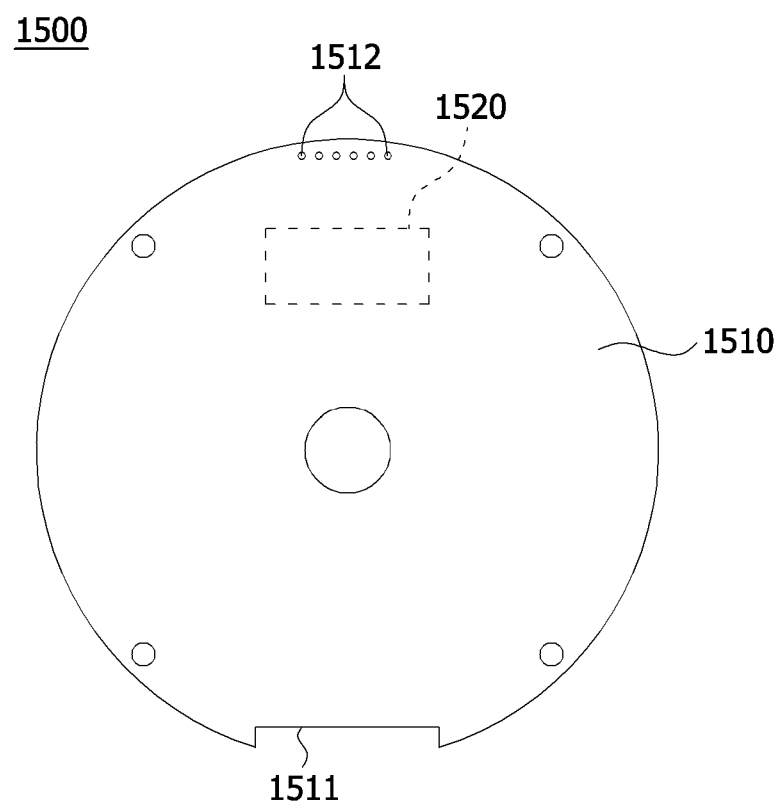

[FIG. 16]
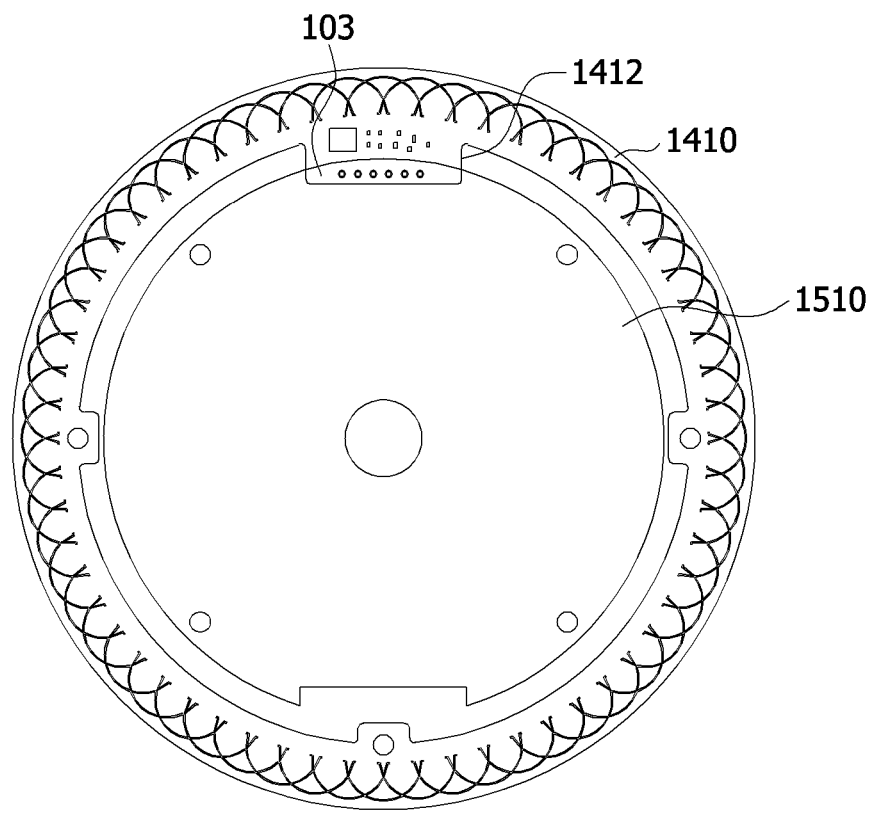

[FIG. 17]
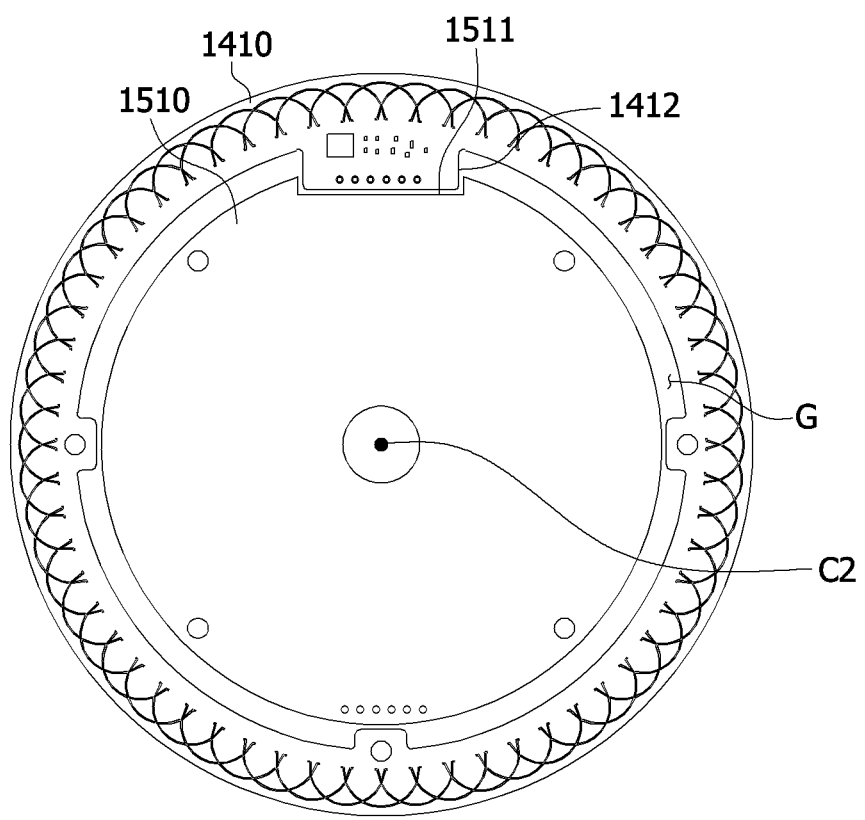

[FIG. 18]
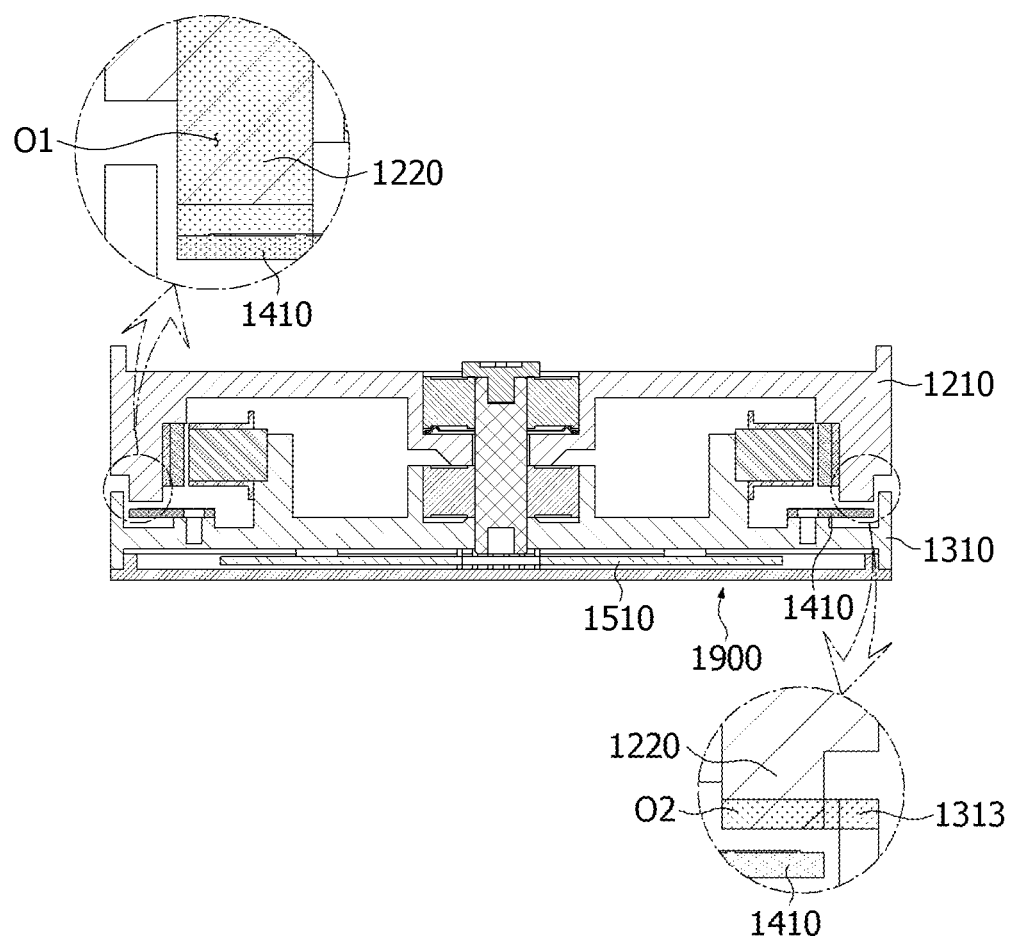

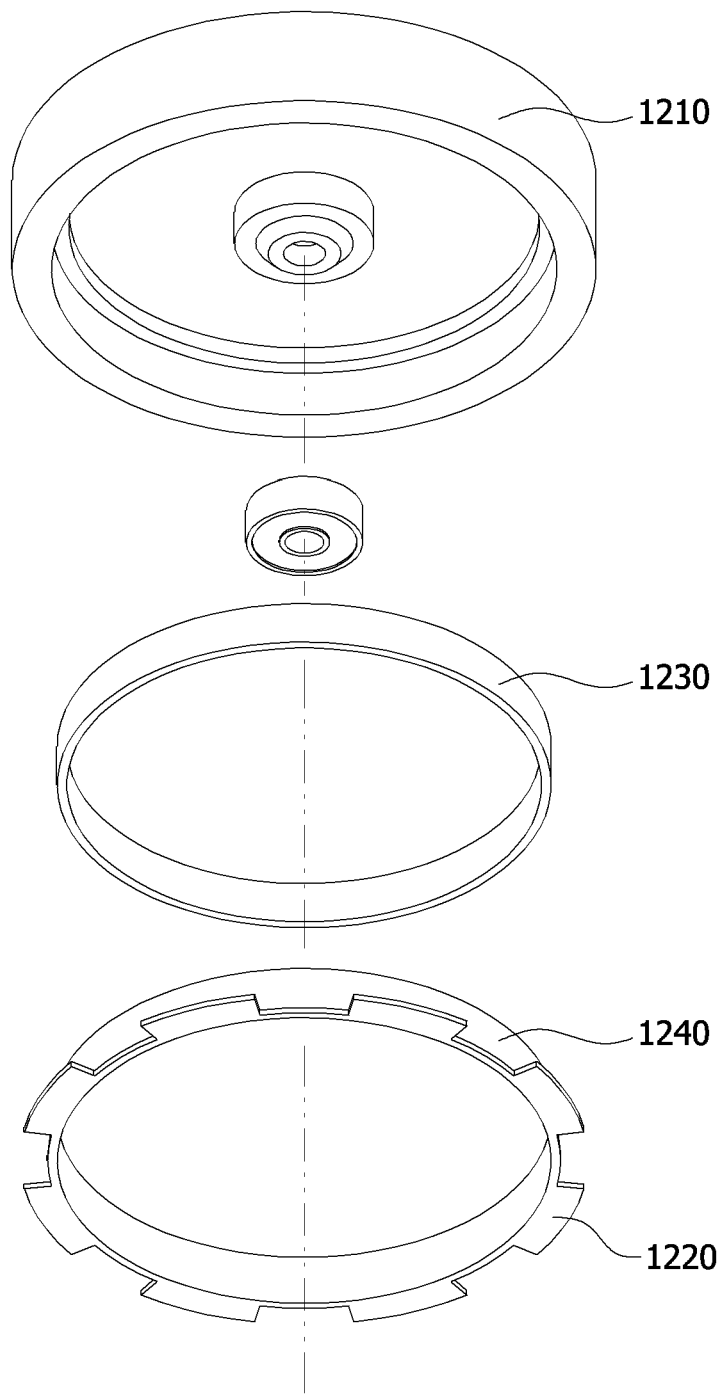
[FIG. 19]

[FIG. 20]
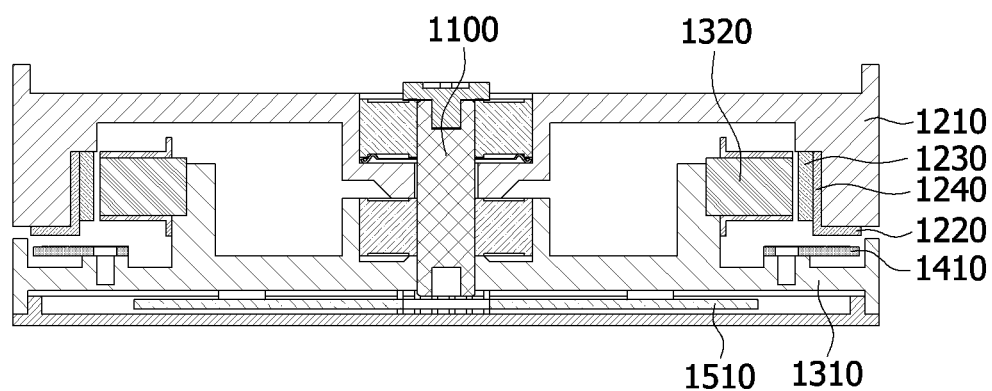

MOTOR WITH SENSOR COIL

This application is a U.S. National Stage Application under 35 U.S.C. § 371 of PCT Application No. PCT/KR2021/001018, filed Jan. 26, 2021, which claims priority to Korean Patent Application Nos. 10-2020-0013618, filed Feb. 5, 2020 and 10-2020-0049373, filed Apr. 23, 2020, whose entire disclosures are hereby incorporated by reference.

TECHNICAL FIELD

The present invention relates to a motor.

BACKGROUND ART

A motor may include a rotor, a stator, and a shaft. The shaft is coupled to the rotor. The rotor may be disposed outside the stator. The rotor rotates due to electromagnetic interaction with the stator, and when rotor rotates, the shaft rotates.

The shaft may be connected to a sensor device (for example, a light detection and ranging (LiDAR).

In order to detect a position of the rotor, the motor may further include a code wheel connected to the rotor, a light source for emitting light to the code wheel, and an optical sensor for detecting light.

However, since such a motor has a complex structure, the motor has problems that a manufacturing process is complex, and the motor is vulnerable to an external force.

Accordingly, a motor, which detects a position of a rotor using a sensing magnet magnetized in a multipolar and a rotary encoder sensor, has been proposed. However, such a motor has problems that the sensing magnet is vulnerable to external magnetism and has low assemblability.

Technical Problem

The present invention is directed to providing a motor of which a strength is structurally high, a structure is simple, and a degree of design freedom is high.

Objectives to be solved through the present invention are not limited to the above-described objectives, and other objectives which are not described above will be clearly understood by those skilled in the art from the following description.

Technical Solution

One aspect of the present invention provides a motor including a motor including a shaft, a rotor including a rotor core and a first coil disposed on the rotor core, a stator including a yoke and a magnet disposed on the yoke, a substrate electrically connected to the first coil, and a first housing coupled to the rotor, wherein the rotor is disposed in the stator, the substrate includes a sensor and a second coil connected to the sensor, the first housing includes a hole, the yoke includes a plurality of protrusions, and the protrusions and the hole are disposed to overlap the second coil in an axial direction.

The motor may further include a second housing rotatably supporting each of the shaft and the rotor core, wherein the rotor core may be disposed above the second housing.

The second housing may include a second body and a bearing housing protruding from the second body, the motor may further include a plurality of bearings disposed in the bearing housing, and some of the plurality of the bearings may be disposed to overlap the first housing in a radial direction.

The yoke may include a first body having an annular shape, and the protrusions may protrude inward from the first body.

The yoke may include a first body having an annular shape and a flange extending from the first body, and the second housing may be in contact with the flange.

The first housing may include a first member coupled to the shaft and the substrate, a second member disposed apart from the first member in the radial direction outside the yoke, and a plurality of third members connecting the first member and the second member, and the hole may be disposed between the first member and the second member in the radial direction.

The yoke may include a first body having an annular shape and a flange extending from the first body, a first inner diameter of the second member may be greater than an outer diameter of the first body and smaller than an outer diameter of the flange.

The yoke may include a first body having an annular shape and a flange extending from the first body, the first member may be disposed to overlap the first body in the radial direction, and the second member may be disposed to overlap the flange in an axial direction.

An outer diameter of the substrate may be greater than an outer diameter of the first member and smaller than a second inner diameter of the second member.

One surface of the protrusion may include an inner circumferential surface having an axial center as a center.

The protrusions may be disposed to overlap the rotor core in the axial direction.

The second coil may be a pattern coil.

Another aspect of the present invention provides a motor including a stator, a rotor disposed above the stator, and a sensing part disposed between the stator and the rotor, wherein the rotor includes a first housing and a plurality of protrusions protruding from the first housing, the sensing part includes a first substrate and a first sensing member disposed on an upper surface of the first substrate, and the plurality of protrusions and the first sensing member overlap in a vertical direction.

The first sensing member may include a coil, the plurality of protrusions may be disposed to form a circular shape, and the coil may be disposed to have a shape corresponding to the circular shape.

The first substrate may include a first region in which the first sensing member is disposed and which has a circular band shape and a second region which protrudes inward from the first region and in which a second sensing member is disposed.

The stator may include a second housing and a stator core, the protrusions of the rotor may protrude from a lower surface of the first housing, and the first substrate may be disposed between the stator core and a bottom surface of the second housing.

The second housing may include an outer wall and an inner wall, and the stator core may be coupled to the inner wall.

The inner wall may include a step formed outward, and the stator core may be disposed on the step.

The first substrate may be disposed between the inner wall and the outer wall.

The rotor may include a magnet disposed on an inner surface of the first housing to correspond to the stator core.

The rotor may include a yoke disposed between the magnet and the inner surface of the first housing.

The motor may include a shaft coupled to the first housing and the second housing, and the first housing and the second housing may include first and second holes coupled to the shaft.

The motor may include a first bearing disposed between the shaft and the first housing and a second bearing disposed between the shaft and the second housing.

Still another aspect of the present invention provides a motor including a second substrate, a stator disposed on the second substrate, a rotor disposed above the stator, a first substrate disposed between the stator and the rotor, a coil disposed on the first substrate, and a connecting member electrically connecting the first substrate and the second substrate, wherein the rotor includes a plurality of protrusions, the coil is disposed to correspond to the plurality of protrusions, and the substrate includes an opening disposed inside the coil.

The rotor may include a yoke disposed between a magnet and an inner surface of the first housing, and the plurality of the protrusions may be formed to extend from a lower end portion of the yoke in a radial direction.

The coil may form a circular shape.

Yet another aspect of the present invention provides a motor including a stator including a second housing, a rotor disposed above the stator and including a first housing, and a sensing part disposed between the first housing and the second housing, wherein the rotor includes a plurality of protrusions protruding from the first housing, the sensing part includes a first substrate and a first sensing member disposed on the first substrate, and the first sensing member and the plurality of protrusions are disposed to correspond to each other.

The motor may include a cover disposed under the first housing and a driving part disposed on the cover, the driving part may include a second substrate and a driving element disposed on the second substrate, and the first substrate and the second substrate may be electrically connected to each other.

Advantageous Effects

According to embodiments, there are advantages of significantly reducing the number of components for detecting a position of a rotor and simplifying a structure.

According to the embodiments, since a yoke which fixes a magnet is used to detect the position of the rotor using magnetic induction, there is an advantage of reducing the number of components.

According to the embodiments, there is an advantage of preventing foreign matters or water from being introduced into a stator.

According to the embodiments, since a part the rotor is used as a component for detecting the position of the rotor, there are advantages of simplifying the structure and facilitating assembly.

According to the embodiments, since a protrusion for detecting the position of the rotor is disposed on the rotor, an error in position between a sensing part and the protrusion is significantly reduced, and thus there is an advantage of more accurately detecting the position of the rotor.

According to the embodiments, since a first substrate and a second substrate are disposed in different spaces, a maximum size of the first substrate on which a coil is disposed is secured, and thus there is an advantage of increasing a resolution when detecting the position of the rotor.

DESCRIPTION OF DRAWINGS

FIG. 1 is a perspective view illustrating a motor according to an embodiment.

FIG. 2 is an exploded perspective view illustrating the motor illustrated in FIG. 1.

FIG. 3 is a side cross-sectional view illustrating the motor along line A-A of FIG. 1.

FIG. 4 is a view illustrating a yoke of a stator illustrated in FIG. 2.

FIG. 5 is a view illustrating a substrate.

FIG. 6 is a view illustrating a first housing.

FIG. 7 is a plan view illustrating the motor illustrated in FIG. 1.

FIG. 8 is a perspective view illustrating a motor according to an embodiment.

FIG. 9 is an exploded perspective view illustrating the motor illustrated in FIG. 8.

FIG. 10 is a side cross-sectional view illustrating the motor illustrated in FIG. 8.

FIG. 11 is a front view illustrating a first housing.

FIG. 12 is a plan view illustrating the first housing.

FIG. 13 is a perspective view illustrating a first substrate and a second substrate.

FIG. 14 is a plan view illustrating the first substrate.

FIG. 15 is a plan view illustrating a driving part.

FIG. 16 is a view illustrating the first substrate and the second substrate in an axial direction.

FIG. 17 is a view illustrating the first substrate and the second substrate manufactured of the same substrate material.

FIG. 18 is a view illustrating positions of an outer wall of the second housing and a position of a protrusion of a rotor.

FIG. 19 is a view illustrating a rotor including a protrusion according to a modified embodiment.

FIG. 20 is a side cross-sectional view illustrating a motor including the rotor illustrated in FIG. 19.

MODES OF THE INVENTION

A direction parallel to a longitudinal direction (vertical direction) of a shaft is an axial direction, a direction perpendicular to the axial direction about a shaft is a radial direction, and a direction along a circle having a radius in the radial direction about the shaft is a circumferential direction.

FIG. 1 is a perspective view illustrating a motor according to an embodiment, FIG. 2 is an exploded perspective view illustrating the motor illustrated in FIG. 1, and FIG. 3 is a side cross-sectional view illustrating the motor along line A-A of FIG. 1. Hereinafter, the term "inward" refers to a direction toward the shaft 100 in a radial direction of the motor and the term "outward" refers to a direction opposite to "inward."

Referring to FIGS. 1 to 3, the motor according to the embodiment may include the shaft 100, a rotor 200, a stator 300, a substrate 400, a first housing 500, and a second housing 600.

The shaft 100 is coupled to the first housing 500. The shaft 100 may be press-fitted to a central portion of the first housing 500. As the shaft 100 rotates, the first housing 500 rotates in conjunction with the rotation of the shaft 100. The shaft 100 is rotatably supported by a bearing 700.

The rotor 200 may include a rotor core 210 and a coil 220. The rotor core 210 may include a plurality of teeth, and the coil 220 is wound around each tooth. The rotor core 210 is coupled to the first housing 500. The rotor core 210 may be fixed to the first housing 500 using a separate coupling member. The rotor core 210 is disposed apart from the second housing 600. Accordingly, as the first housing 500 rotates, the rotor 200 also rotates with the first housing 500. Meanwhile, insulators 230 may be disposed between the rotor core 210 and the coil 220.

The stator 300 is disposed outside the rotor 200. The stator 300 may include a yoke 310 and a magnet 320. The magnet 320 is fixed to the yoke 310.

The substrate 400 is electrically connected to the coil 220. The substrate 400 may be coupled to one side of the first housing 500. The substrate 400 is fixed to the first housing 500 using a separate coupling member. Accordingly, as the first housing 500 rotates, the substrate 400 also rotates with the housing 500. Sensors 410 and coils 420 may be disposed on the substrate 400. An air gap is formed between the substrate 400 and the yoke 310 in an axial direction.

The first housing 500 is coupled to the shaft 100. The substrate 400 is disposed at one side of the first housing 500. The yoke 310 of the stator 300 is disposed at the other side of the first housing 500. In addition, the first housing 500 is coupled to the rotor core 210.

The second housing 600 is disposed at one side of the stator 300. Accordingly, the stator 300 and the rotor 200 are disposed between the second housing 600 and the first housing 500 in the axial direction. The second housing 600 may include a second body 610 and a bearing housing 620. The yoke 310 of the stator 300 is fixed to the second body 610. The bearing housing 620 protrudes from the second body 610. The bearing housing 620 may be a hollow member having an empty interior. The bearing 700 is disposed in the bearing housing 620. The shaft 100 is disposed to pass through the bearing housing 620.

FIG. 4 is a view illustrating the yoke 310 of the stator 300 illustrated in FIG. 2.

Referring to FIGS. 3 and 4, the yoke 310 of the stator 300 is formed of a metal material and is a member for fixing the magnet 320 and generating an induced electromotive force through an interaction with the coil 220 disposed on the substrate 400. In the motor according to the embodiment, a position of the rotor 200 is detected through magnetic induction using a part of the yoke 310 fixing the magnet 320 instead of using a separate sensing magnet in order to detect the position of the rotor 200. A part of the yoke 310 has a shape to induce the induced electromotive force to be intermitted according to rotation of the rotor 200.

For example, the yoke 310 may include a first body 311, a plurality of protrusions 312, and a flange 313. The first body 311 is an annular member. The flange 313 may be disposed to extend outward from one side of the first body 311. The plurality of protrusions 312 may be disposed to extend outward from the other side of the first body 311.

The magnet 320 may be fixed to an inner circumferential surface of the first body 311. The magnet 320 may be one ring-shaped magnet 320 or may be formed by combining a plurality of unit magnets 320.

The flange 313 is in fixed contact with one surface of the second body 610 of the second housing 600.

The plurality of protrusions 312 may be disposed at predetermined intervals in a circumferential direction of the yoke 310. The protrusions 312 may be flat plate members. Inner edges 312a of the protrusions 312 may have curved surfaces. The protrusions 312 may be disposed to overlap the magnet 320 and a part of the rotor core 210 in the axial direction. In addition, the protrusions 312 may be disposed to overlap a part of the substrate 400 in the axial direction and parts of the coils 420 disposed on the substrate 400.

The number of the protrusions 312 may be variously adjusted to correspond to a resolution of the sensors 410. The protrusions 312 interact with the coils 420 of the substrate 400 to generate an induced electromotive force. Due to gaps between the protrusions 312, a deviation of the induced electromotive force occurs intermittently, and the sensor 410 detects the deviation to recognize one rotation of the rotor 200.

FIG. 5 is a view illustrating the substrate 400.

Referring to FIGS. 3 and 5, the sensors 410 and the coils 420 are disposed on the substrate 400. The sensors 410 are electrically connected to the coils 420 and measure a change in induced electromotive force according to rotation of the substrate 400. At least some of the coils 420 may be pattern coils. The coils 420 may be coils in which a first coil 421 and a second coil 422 having different shapes and sizes are combined. For example, the first coil 421 has a radial shape, and the second coil 422 may have an annular shape.

The substrate 400 may have a circular flat plate shape, and the coils 420 may be symmetrically disposed with respect to a center of the substrate 400. For example, the coils 420 may be rotationally symmetrically disposed with respect to the center of the substrate 400. Meanwhile, a plurality of holes 430 may be disposed in the substrate 400. Separate coupling members pass through the holes 430 to couple the substrate 400 and the first housing 500.

FIG. 6 is a view illustrating the first housing 500.

Referring to FIGS. 3 and 6, the first housing 500 rotates with the substrate 400 when the shaft 100 rotates. Due to the first housing 500, a separation distance between the substrate 400 and the yoke 310 is secured in the axial direction. In addition, the first housing 500 covers an outer side of the yoke 310 to block foreign matters from being introduced into the stator 300.

The first housing 500 may include a first member 510, a second member 520, and third members 530.

The first member 510 may be a disc member. The substrate 400 is coupled to the first member 510. Holes 511 through which coupling members pass may be disposed in the first member 510 to be coupled to the substrate 400. A hole 512 to which the shaft is press-fitted may be disposed in a central portion of the first member 510.

The second member 520 may be an annular member. The second member 520 disposed apart from the first member 510. In addition, the second member 520 is disposed outside the yoke 310. The second member 520 may be disposed to overlap the first body 311 of the yoke 310 in a radial direction. In addition, the second member 520 may be disposed to overlap the flange 313 of the yoke 310 in the axial direction.

A first inner diameter D2 of the second member 520 is greater than an outer diameter D1 of the first body 311 of the yoke 310 and smaller than an outer diameter D3 of the flange 313. In an inner circumferential surface of the second member 520, the first inner diameter D2 of the second member 520 is an inner diameter of the inner circumferential surface of the second member 520 disposed to overlap the yoke 310 in the radial direction.

Since the second member 520 covers the outer side of the yoke 310 in the radial direction and in the axial direction, foreign masses or water can be prevented from being introduced into the stator 300.

The third members 530 are members connecting the first member 510 and the second member 520. The plurality of third members 530 may be provided. Separation spaces between the first member 510 and the second member 520 and edges of the third members 530 form holes 540. The protrusions 312 of the yoke 310 and parts of the coils 420 of the substrate 400 are disposed to face through the holes 540. The plurality of holes 540 may be disposed. The plurality of holes 540 may be disposed in a circumferential direction of the first housing 500. The number of the holes 540 may be correspond to the number of the protrusions 312 of the yoke 310.

FIG. 7 is a plan view illustrating the motor illustrated in FIG. 1.

Referring to FIGS. 3 and 7, a size of each of the holes 540 may be greater than a size of each of the protrusions 312 of the yoke 310. For example, when the motor is viewed in the axial direction in a state in which the protrusion 312 and the hole 540 are aligned, the inner edge 312*a* of the protrusion 312 may be disposed further outward than an inner edge 541 of the hole 540, a gap may be formed between the protrusion 312 and the first member 510 in the radial direction, and a gap may also be formed between the protrusion 312 and the third member 530. The inner edge 312*a* of the protrusion 312 may be an inner circumferential surface about an axial center.

When the motor is viewed in the axial direction, the substrate 400 is disposed so that an outer edge portion overlaps the protrusion 312. An outer diameter D4 of the substrate 400 is set to be greater than an outer diameter D5 of the first member 510 and smaller than a second inner diameter D6 of the second member 520. In the inner circumferential surface 542 of the second member 520, the second inner diameter D6 of the second member 520 is an inner diameter of the inner circumferential surface of the second member 520 which is disposed not to overlap the yoke 310 in the radial direction.

Meanwhile, a width W1 of the protrusion 312 in a circumferential direction may be set to be greater than a separation distance W2 between the protrusions 312 in the circumferential direction.

The shaft 100 rotates due to an electrical interaction between the coil 220 and the magnet 320. When the shaft 100 rotates, the first housing 500 and the substrate 400 rotate together. Accordingly, while the coils 420 disposed on the substrate 400 rotate, induction magnetism is generated between the coils 420 and the protrusions 312 of the yoke 310, and the sensors 410 detects a change in induction magnetism. As described above, since the protrusions 312 which are a part of the yoke 310 and the coils 420 disposed on the substrate 400 are used to detect a position of the rotor 200, a structure of the motor can be very simplified.

FIG. 8 is a perspective view illustrating a motor according to an embodiment, FIG. 9 is an exploded perspective view illustrating the motor illustrated in FIG. 8, and FIG. 10 is a side cross-sectional view illustrating the motor illustrated in FIG. 8. Hereinafter, the term "inward" refers to a direction toward the shaft 1100 in a radial direction of the motor and the term "outward" refers to a direction opposite to "inward."

Referring to FIGS. 8 to 10, the motor according to the embodiment may include the shaft 1100, a rotor 1200, a stator 1300, a sensing part 1400, a second substrate 1510, a connecting member 1600, a driving part 1500, bearings 1800, and a cover 1900.

The shaft 1100 is coupled to a second housing 1310. The shaft 1100 can be press-fitted to a central portion of the second housing 1310.

The rotor 1200 rotates about the shaft 1100. The rotor 1200 may include a first housing 1210, protrusions 1220, and a yoke 1240. A first bearing 1810 is fixed to a central portion of the first housing 1210. The protrusions 1220 may be disposed on a lower surface 1211 of the first housing 1210. The yoke 1240 is a metal member and may be disposed on an inner surface of a sidewall of the first housing 1210. The yoke 1240 is disposed between an inner surface of the first housing 1210 and a magnet 1230. The magnet 1230 may be fixed inside the yoke 1240. The magnet 1230 may be one ring magnet 1230 or may be formed by combining a plurality of unit magnets 1230. Meanwhile, a first hole 1212 through which the shaft 1100 passes may be formed in the central portion of the first housing 1210.

The stator 1300 may include the second housing 1310, a stator core 1320, and insulators 1330.

A second bearing 1800 may be disposed in the central portion of the second housing 1310. The second bearing 1800 supports the shaft 1100. In addition, the second housing 1310 may include an inner wall 1312 and an outer wall 1313. The inner wall 1312 is disposed closer to the central portion of the second housing 1310 than the outer wall 1313 in a radial direction. The inner wall 1312 and the outer wall 1313 are portions protruding from a bottom surface 1311 of the second housing 1310 in an axial direction of the shaft 1100. Both the inner wall 1312 and the outer wall 1313 may be annular members each including an inner circumferential surface and an outer circumferential surface. The inner wall 1312 may be disposed apart from the second bearing 1800 in the radial direction.

The stator core 1320 is coupled to the inner wall 1312 of the second housing 1310. For example, the stator core 1320 may be coupled to the second housing 1310 so that an inner circumferential surface of the stator core 1320 is in contact with the outer circumferential surface of the inner wall 1312. In addition, the inner wall 1312 of the second housing 1310 may include a step 1312*a*, and the stator core 1320 may be disposed on the step 1312*a*. Meanwhile, a second hole 1314 through which the shaft 1100 passes may be disposed in the central portion of the second housing 1310.

The sensing part 1400 detects a position of the rotor 1200. The sensing part 1400 may include a first substrate 1410 and a first sensing member 1420.

The first substrate 1410 may be disposed above the second housing 1310. In addition, the first substrate 1410 is disposed above the bottom surface 1311 of the second housing 1310. The first substrate 1410 may be disposed between the inner wall 1312 and the outer wall 1313 of the second housing 1310.

The first substrate 1410 may be disposed under the protrusions 1220 of the second housing 1310. The first substrate 1410 and the protrusions 1220 of the second housing 1310 are disposed to face in the axial direction of the shaft 1100. The first substrate 1410 is an annual member and may include an opening 1401.

The first sensing member 1420 may be disposed on the first substrate 1410. The first sensing member 1420 may be a coil. The first sensing member 1420 may interact with the protrusions 1220 of the second housing 1310 to generate an induced electromotive force. The first sensing member 1420 may have a shape in which a predetermined pattern repeats. An overall shape of the first sensing member 1420 may be a circular shape.

The driving part 1500 may be positioned under the second housing 1310. The driving part 1500 may include the second substrate 1510 and a driving element 1520 disposed on the second substrate 1510.

The connecting member 1600 electrically connects the first substrate 1410 and the second substrate 1510. The connecting member 1600 may be a connector or connecting pin disposed to pass through the second housing 1310.

The bearings 1800 may include the first bearing 1810 and a second bearing 1820. The first bearing 1810 is fixed to the first housing 1210 and supports the shaft 1100. The second bearing 1820 is fixed to the second housing 1310 and supports the shaft 1100.

The cover 1900 is coupled to the second housing 1310 to cover a space of the second housing 1310 in which the second substrate 1510 is disposed.

FIG. 11 is a front view illustrating the first housing 1210, and FIG. 12 is a plan view illustrating the first housing 1210.

Referring to FIGS. 11 and 12, the first housing 1210 may include the plurality of protrusions 1220. The protrusions 1220 may protrude from the lower surface 1211 of the first housing 1210. The protrusions 1220 interact with the first sensing member 1420 disposed on the first substrate 1410 to generate an induced electromotive force when the first housing 1210 rotates. The plurality of protrusions 1220 may be disposed at predetermined intervals based on a center of the first housing 1210 in a circumferential direction. A part of a side surface of each of the protrusions 1220 may have a curved surface. In addition, the other part of the side surface of the protrusion 1220 may be disposed so that an extension surface may be disposed to pass through a center C1 of the first housing 1210.

Since the protrusions 1220 are formed to protrude as a part of the first housing 1210, a separate component for detecting a position of the rotor 1200 is not required, and thus there is an advantage of simple structure.

The first hole 1212 through which the shaft 1100 passes may be disposed in the central portion of the first housing 1210.

FIG. 13 is a perspective view illustrating the first substrate 1410 and the second substrate 1510, and FIG. 14 is a plan view illustrating the first substrate 1410.

Referring to FIGS. 13 and 14, the first substrate 1410 is an annular member including an inner circumferential surface. The first substrate 1410 is a substrate for detecting a position of the rotor 1200. The first substrate 1410 may be divided into a first region 1411 and a second region 1412. The first region 1411 is a region in which the first sensing member 1420 is disposed and may have a circular band shape. The second region 1412 is a region in which a second sensing member 1416 is disposed and protrudes inward from an inner circumferential surface of the first region 1411.

The second sensing member 1416 is also a member for detecting a position of the rotor 1200 may be a Hall integrated circuit (IC) for detecting a change in magnetic force detected by the magnet 1230. In addition, the second region 1412 may include an inductive encoder 1413 which is connected to the first sensing member 1420 and detects an induced electromotive force. In addition, a first pin hole 1414 connected to the connecting member 1600 may be disposed in the second region 1412. In addition, a plurality of coupling parts 1415 for coupling to the second housing 1310 may be disposed on the second substrate 1510. The coupling parts 1415 may be disposed to protrude from the inner circumferential surface of the first region 1411.

The first sensing member 1420 is a member in which a coil having a predetermined pattern is disposed along the first region 1411 and disposed to face the protrusions 1220. Accordingly, the first sensing member 1420 is disposed along a path along which the protrusions 1220 rotate about an axial center.

FIG. 15 is a plan view illustrating the driving part 1500.

Referring to FIG. 15, the driving part 1500 includes the second substrate 1510 and the driving element 1520. The second substrate 1510 is a circular member. The driving element 1520 disposed on the second substrate 1510 and controls the motor to be driven. A second pin hole 1512 connected to the connecting member 1600 may be disposed in the second substrate 1510. A groove 1511 may be disposed in the second substrate 1510. The groove 1511 is concavely formed inward from an edge of the second substrate 1510. A shape of the groove 1511 corresponds to a shape of the second region 1412 of the first substrate 1410.

FIG. 16 is a view illustrating the first substrate 1410 and the second substrate 1510 in an axial direction.

Referring to FIGS. 10 and 16, the first substrate 1410 is disposed outside the second substrate 1510 when viewed in the axial direction. The first substrate 1410 has a greater size than the second substrate 1510 in the radial direction. Accordingly, a radius of the first sensing member 1420 disposed on the first substrate 1410 increases. In addition, since the radius of the first sensing member 1420 increases, a resolution for detecting a position of the rotor 1200 increases, and thus the position of the rotor 1200 can be more precisely detected.

Installation spaces of the first substrate 1410 and the second substrate 1510 are divided in the axial direction. The first substrate 1410 is disposed above the second housing 1310, and the second substrate 1510 is disposed under the second housing 1310. In addition, the second substrate 1510 is disposed in a sealed space which is a waterproof and dustproof space and is formed by coupling the second housing 1310 and the cover 1900. Since the driving element 1520 of the motor is disposed on the second substrate 1510, it is advantageous for the second substrate 1510 to be divided from the first substrate 1410 and disposed in a separate space in terms of stability. That is, the first substrate 1410, which needs a large radius to increase a resolution, is disposed above the second housing 1310 to secure an installation space, and the second substrate 1510, which needs to be waterproof and dustproof regardless of a resolution, is disposed under the second housing 1310 to secure stability.

A part of the second region 1412 of the first substrate 1410 may be disposed to overlap the second substrate 1510 in the axial direction. This is to electrically connect the first substrate 1410 and the second substrate 1510 and to arrange a connection position of the connecting member 1600 for the first substrate 1410 and the second substrate 1510. For example, the part 103 of the second region 1412 of the first substrate 1410 may be disposed to overlap the second substrate 1510 in the axial direction to align the first pin hole 1414 of the first substrate 1410 with the second pin hole 1512 of the second substrate 1510.

FIG. 17 is a view illustrating the first substrate 1410 and the second substrate 1510 manufactured of the same substrate material.

Referring to FIG. 17, the first substrate 1410 and the second substrate 1510 are manufactured of the same substrate material. Accordingly, when the first substrate 1410 and the second substrate 1510 are disposed on the same axis C2, the second substrate 1510 is disposed inside the first substrate 1410, and the second region 1412 of the first substrate 1410 corresponds to the groove 1511 of the second substrate 1510. In addition, a gap G is formed between the first substrate 1410 and the second substrate 1510. The first substrate 1410 and the second substrate 1510 have an advantage of maximally using the quadrangular substrate material.

FIG. 18 is a view illustrating positions of the outer wall 1313 of the second housing 1310 and the protrusions 1220 of the rotor 1200.

Referring to FIGS. 14 and 18, the protrusions 1220 are disposed to overlap the first sensing member 1420 of the first substrate 1410 to form an overlap region O1 in a vertical direction (axial direction). Meanwhile, the outer wall 1313 of the second housing 1310 may be disposed to overlap the protrusions 1220 of the rotor 1200 to form an overlap region in the radial direction. The outer wall 1313 of the second housing 1310 has an effect of preventing foreign matters or water from being introduced into the rotor 1200.

FIG. 19 is a view illustrating a rotor 1200 including protrusions according to a modified embodiment, and FIG. 20 is a side cross-sectional view illustrating a motor including the rotor 1200 illustrated in FIG. 19.

Referring to FIG. 19, the protrusions 1220 may be disposed on a yoke 1240. For example, the protrusions 1220 may be disposed to extend outward from a lower end portion of the yoke 1240 in a radial direction. The plurality of protrusions 1220 may be radially disposed based on a center of the yoke 1240. The plurality of protrusions 1220 may be disposed at predetermined intervals in a circumferential direction of the yoke 1240. That is, a part of the yoke 1240 is used as the protrusions 1220, and the protrusions 1220 are disposed on a lower surface of a first housing 1210 and face a first substrate 1410 in an axial direction. The protrusions 1220 interact with a first sensing member 1420 to generate an induced electromotive force.

The above-described embodiments can be utilized for various devices such as vehicles or home appliances.

The invention claimed is:

1. A motor comprising:
a shaft;
a rotor including a rotor core and a first coil disposed on the rotor core;
a stator including a yoke and a magnet disposed on the yoke;
a substrate electrically connected to the first coil; and
a first housing coupled to the rotor,
wherein
the rotor is disposed in the stator,
the substrate includes a sensor and a second coil connected to the sensor,
the first housing includes a hole,
the yoke includes a plurality of protrusions, and
the protrusions and the hole are disposed to overlap the second coil in an axial direction.

2. The motor of claim 1, further comprising a second housing rotatably supporting each of the shaft and the rotor core,
wherein the rotor core is disposed above the second housing.

3. The motor of claim 2, wherein:
the second housing includes a second body and a bearing housing protruding from the second body;
the motor further comprises a plurality of bearings disposed in the bearing housing; and
some of the plurality of the bearings are disposed to overlap the first housing in a radial direction.

4. The motor of claim 2, wherein:
the yoke includes a first body having an annular shape and a flange extending from the first body; and
the second housing is in contact with the flange.

5. The motor of claim 1, wherein:
the yoke includes a first body having an annular shape; and
the protrusions protrude inward from the first body.

6. A motor comprising:
a second substrate;
a stator disposed on the second substrate;
a rotor disposed above the stator; and
a first substrate disposed between the stator and the rotor;
a coil disposed on the first substrate; and
a connecting member electrically connecting the first substrate and the second substrate,
wherein
the rotor includes a first housing and a plurality of protrusions protruding from the first housing,
the plurality of protrusions and the coil overlap in a vertical direction,
the first substrate includes an opening disposed inside the coil.

7. The motor of claim 6, wherein:
the plurality of protrusions are disposed to form a circular shape; and
the coil is disposed to have a shape corresponding to the circular shape.

8. The motor of claim 6, further comprising a sensing part disposed between the stator and the rotor,
wherein the sensing part includes a first sensing member disposed on an upper surface of the first substrate, and
wherein the first substrate includes:
a first region in which the first sensing member is disposed and which has a circular band shape; and
a second region which protrudes inward from the first region and in which a second sensing member is disposed.

9. The motor of claim 6, wherein the stator includes a second housing and a stator core, the protrusions of the rotor protrude from a lower surface of the first housing, and the first substrate is disposed between the stator core and a bottom surface of the second housing.

10. The motor of claim 9, wherein the second housing includes an outer wall and an inner wall, and the stator core is coupled to the inner wall.

* * * * *